US007000007B1

(12) United States Patent
Valenti

(10) Patent No.: US 7,000,007 B1
(45) Date of Patent: Feb. 14, 2006

(54) SYSTEM AND METHOD FOR INTERNET BROADCAST SEARCHING

(76) Inventor: Mark E. Valenti, 12826 Big Horn La., Knoxville, TN (US) 37922

( * ) Notice: Subject to any disclaimer, the term of this patent is extended or adjusted under 35 U.S.C. 154(b) by 733 days.

(21) Appl. No.: 09/613,387

(22) Filed: Jul. 11, 2000

Related U.S. Application Data

(60) Provisional application No. 60/175,910, filed on Jan. 13, 2000.

(51) Int. Cl.
*G06F 15/16* (2006.01)

(52) U.S. Cl. .................. 709/219; 709/217; 709/203; 707/3; 707/10

(58) Field of Classification Search ........ 709/217–219, 709/203, 229, 223–224; 707/3, 10
See application file for complete search history.

(56) References Cited

U.S. PATENT DOCUMENTS

| | | | |
|---|---|---|---|
| 4,914,571 A | | 4/1990 | Baratz et al. ............... 364/200 |
| 5,696,898 A | * | 12/1997 | Baker et al. ................ 709/229 |
| 5,740,549 A | | 4/1998 | Reilly et al. .................. 705/14 |
| 5,761,662 A | * | 6/1998 | Dasan ......................... 707/10 |
| 5,761,663 A | | 6/1998 | Lagarde et al. ............... 707/10 |
| 5,778,185 A | | 7/1998 | Gregerson et al. ..... 395/200.56 |
| 5,778,367 A | * | 7/1998 | Wesinger, Jr. et al. ...... 709/217 |
| 5,920,856 A | | 7/1999 | Syeda-Mahmood ............ 707/3 |
| 5,924,094 A | | 7/1999 | Sutter ......................... 707/10 |
| 5,974,409 A | | 10/1999 | Sanu et al. .................... 707/3 |
| 5,974,441 A | | 10/1999 | Rogers et al. .............. 709/200 |
| 5,995,959 A | | 11/1999 | Friedman et al. .............. 707/3 |
| 6,055,526 A | | 4/2000 | Ambroziak .................... 707/2 |
| 6,055,543 A | | 4/2000 | Christensen et al. ........ 707/104 |
| 6,085,225 A | | 7/2000 | Nakajima et al. ........... 709/203 |

(Continued)

FOREIGN PATENT DOCUMENTS

WO    WO 90 08360 A    7/1990

(Continued)

OTHER PUBLICATIONS

Sheldon, M.A. et al: "Discover: A resource discovery system based on content routing" Computer Networks and ISDN Systems, North Holland Publishing. Amsterdam, NL. vol. 27, No. 6, Apr. 1, 1995. pp. 953-972.

(Continued)

*Primary Examiner*—Philip B. Tran
(74) *Attorney, Agent, or Firm*—Roberts, Abokhair & Mardula, LLC

(57) ABSTRACT

An Internet Broadcast Search Paradigm (IBSP) is disclosed, which causes a search for information on the world wide web to be distributed to all website computers on a network. The IBSP three basic embodiments: a direct broadcast server, a broadcast server, and a firewall server embodiment. However, other combinations are also possible. The IBSP direct broadcast process involves a client (and user) computer, a website computer, and an IBSP server computer. Each individual user conducts any desired search. In addition, website computers are present and are those computers which typically host and serve a website to the public. In general, there will be a single IBSP server computer although this is not meant as a limitation. In order to speed up the system and to accomplish load balancing, multiple IBSP server computers may be present in the system, although they are not necessarily required.

17 Claims, 3 Drawing Sheets

U.S. PATENT DOCUMENTS

| | | | |
|---|---|---|---|
| 6,195,654 B1 | 2/2001 | Wachtel | 707/3 |
| 6,236,991 B1 * | 5/2001 | Frauenhofer et al. | 707/10 |
| 6,266,788 B1 * | 7/2001 | Othmer et al. | 707/202 |
| 6,308,202 B1 * | 10/2001 | Coln et al. | 709/217 |
| 6,324,577 B1 * | 11/2001 | Hirai | 709/223 |
| 6,334,145 B1 * | 12/2001 | Adams et al. | 709/217 |
| 6,374,237 B1 * | 4/2002 | Reese | 707/10 |
| 6,385,602 B1 * | 5/2002 | Tso et al. | 707/3 |
| 6,442,555 B1 * | 8/2002 | Shmueli et al. | 707/101 |
| 6,460,036 B1 * | 10/2002 | Herz | 707/10 |
| 6,519,585 B1 * | 2/2003 | Kohli | 707/3 |

FOREIGN PATENT DOCUMENTS

| | | |
|---|---|---|
| WO | WO 99 57656 A | 11/1999 |

OTHER PUBLICATIONS

Linn, C.N.: "A multi-agent system for cooperative document indexing and querying in distributed networked environments" Parallel Processing, 1999. Proceedings. 1999 International Workshops on Aizu-Wakamatsu, Japan Sep. 21-24, 1999, Los Alamitos, CA, USA. pp. 400-405.

* cited by examiner

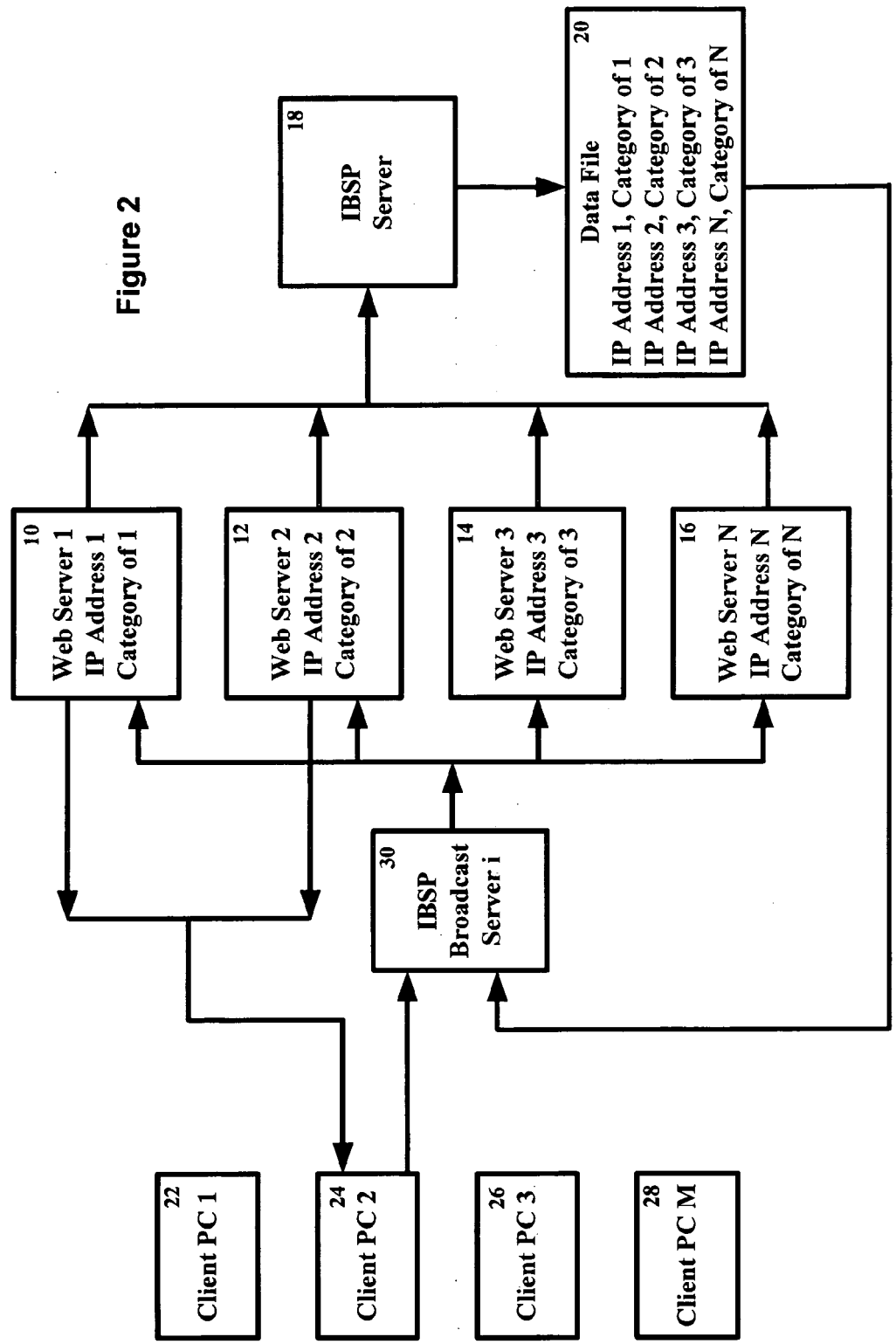

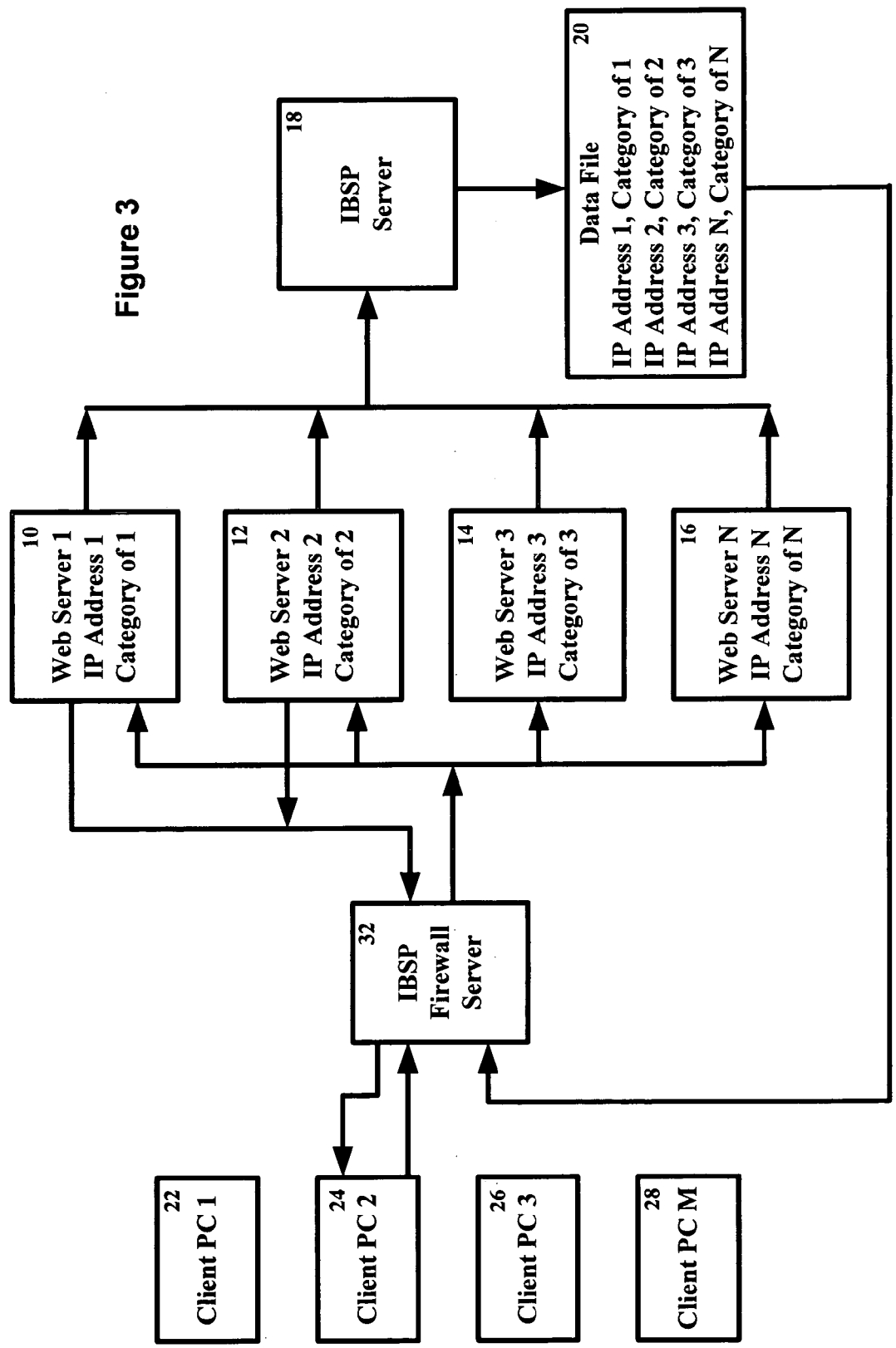

SYSTEM AND METHOD FOR INTERNET BROADCAST SEARCHING

This application is a utility application which claims both the benefit and priority of Ser. No. 60/175,910 filed Jan. 13, 2000 entitled "Natural Language Broadcast Search Paradigm."

FIELD OF THE INVENTION

This invention relates generally to searching on the World Wide Web. In this usage the World Wide Web is meant to include all Internets and all Intranets, i.e. all computer networks, interconnected or not. More particularly, the present invention comprises a search paradigm implemented in hardware and software which distributes the search for information on the world wide web to all website computers which then search their own databases for elements of the requested search.

BACKGROUND OF THE INVENTION

Internet searching is now the subject of much activity as well as research. Search engines for both general and specific purposes abound. For example, search engines from such websites as Yahoo.com, Excite.com, Lycos.com, Northernlight.com, all attempt to build an index of the world wide web by accumulating website information in a centralized database on a centralized computer system. Thus, any of these systems involves literally indexing tens of millions of pages of information in order to allow a search against that information be accomplished. Thus, when a user desires to find specific information, the selected search engine must search its centralized index database. Further, the centralized database must continue to update its database of web pages or other computerized information in order to be current and accurate in the searching that is performed. Obviously this inefficiency results in a difficult and computationally expensive task.

Because of the structure of the centralized indexed database, search engines are relatively static and do not receive instantaneous updates of information on individual websites as those websites change. In addition, as new websites become active on the Internet or as websites become inactive, search engines do not necessarily pick up this fact leading to the reporting of results for websites that may no longer be present on the web and missing the results from new websites.

Search engines also will never be able to contain all information from all websites. This necessarily leads to searches which are not complete and result in missed websites and information. Finally, certain search engines can be manipulated to deliver preferred websites. Thus, an individual user searching the web may not receive the best websites but will receive websites which the particular search engine prefers.

Enhancement of the web surfing process has been the subject of invention. For example, U.S. Pat. No. 5,761,663 to Lagarde et al was issued for a "Method for Distributed Task Fulfillment of Web Browser requests." This invention causes requests from a browser to be made to web servers on a network which receive and fulfill requests as an agent of the browser client. Thus, either individuals searching by agents must take place or, databases again exist which must be searched and which would potentially suffer from the same problems as described above.

U.S. Pat. No. 5,974,409 to Sanu et al was issued for a "System and Method for Locating Information in an Online Network." This particular system operates as an extension of a computer's operating system and not as a separate browser. Again, multiple servers search different services in order to obtain information on what is stored in the various services.

U.S. Pat. No. 5,974,441 to Rogers et al was issued for a "WWW Client Server Interactive System Method with Java." This patent makes requests to web servers on a network which receive and fulfill requests as an agent of the browser client. It organizes distributed sub agents in a series of servers which then conduct searching. Thus, a distributed network of servers conduct additional searches returning the results to the client.

Other systems such as U.S. Pat. No. 6,055,526 to Ambroziak ("A Data Indexing Technique"), U.S. Pat. No. 5,995,959 to Friedman et al ("Method and System for Network Information Access"), U.S. Pat. No. 5,920,856 to Syeda-Mahmood ("System for Selecting Multi-Media Databases Over Networks"), and U.S. Pat. No. 4,914,571 to Baratz et al ("Locating Resources in Computer Networks"), all rely upon obtaining information or META-information about data that is stored in a network and searching that information. All of these techniques also suffer from the issue of currency. That is, is all the information that is being searched all of the information that is available to be searched? In all cases the answer is no.

What would be truly useful is a system and method for searching the entire content of the ever changing World Wide Web in its current state (i.e. the state at the time and date of the searching) in the shortest time possible. Such a system would be able to search not an index of pages, but the pages themselves returning results based upon what actually exists and not based upon a summary of what actually exists.

SUMMARY OF THE INVENTION

It is therefore an objective of the present invention to provide a more efficient method of searching information on the World Wide Web.

It is yet another objective of the present invention to return results of a world wide web search to a user which are current and not the result of stored information about the information on the web.

It is yet another objective of the present invention to search for information on the web that is accurate as of the moment of the search.

It is yet another objective of the present invention to conduct searching without the need to update any centralized database of information.

It is a further objective of the present invention to conduct simultaneous searching of all information from all websites on the World Wide Web.

It is yet another objective of the present invention to treat all search requests equally, that is without regard to delivering preferred websites.

It is a further objective of the present invention to allow each search request to instantaneously account for changes in information at each website.

It is a further objective of the present invention to allow searches to account for the activation and deactivation of websites.

It is still another objective of the present invention to allow multiple website computers to search information on their own websites. It is another objective of the present invention to perform World Wide Web searches in the minimum theoretical time possible.

It is still a further objective of the present invention to allow a search to generate subsequent searches by website computers, each website computer being responsible for the most current information on its own website.

These and other objectives of the present invention will become apparent from a review of the specification that follows.

The present invention comprises an Internet Broadcast Search Paradigm (IBSP) which causes a search for information on the world wide web to be distributed to all website computers The IBSP generally comprises three different embodiments: a direct broadcast, a broadcast server, and a firewall server embodiment. However, other combinations, as described later, are also possible.

The IBSP direct broadcast process involves a client (and user) computer, a website computer, and an IBSP server computer. Obviously there are many client computers which utilize the system. Each of these computers would be, for example and without limitation, a PC owned by an individual. Each individual would conduct any desired search. In addition, website computers are present and are those computers which typically host and serve a website to the public. In general, there will be a single IBSP server computer although this is not meant as a limitation. In order to speed up the system and to accomplish load balancing, multiple IBSP server computers may be present in the system, although they are not necessarily required.

Each of the three computer types contains a different IBSP computer program which interacts with the other programs of the system. For example: website computers contain an IBSP website computer program which permits multi level categorization of the websites content by the web master. An example of such categorization is the language used at the website, general website contents such as health, government, entertainment, sports, etc. Other categorization of the website content can also be created by the IBSP website computer program. Thus, for example, the category of "education" may have multiple sublevels for elementary school, college, language, and other categories.

The IBSP website computer program transmits the categorization information and the website's internet address, i.e. its fully qualified domain name and/or its IP address from the website to the IBSP server computer at the initialization of the website computer and at various times thereafter. Further, the IBSP website computer program receives and processes requests for information, such as search queries, from the client computers. If the website has the requested information, it sends that information to the client computer.

The IBSP server computer contains an IBSP server computer program which receives and stores in a data file the IP address and the website categorization information received from all of the website computers. In this usage, IP address, means either a computer's IP address and/or its fully qualified domain name. Further, the IBSP server computer program transmits the data file containing the IP address and the website characterization of all website computers to client computers upon request.

Client computers contain an IBSP client computer program which acquires the data file containing the IP address and website categorization information of all website computers from the IBSP computer. This occurs upon installation, periodically thereafter and when requested by the client.

The client computer accepts queries (search requests) from the user of the client computer for distribution over the World Wide Web. The client computer software permits users to categorize each query with the multi level website categorization information. The query can then be transmitted by the client to all websites that have the same multi level categorization as the query. Finally, the client IBSP software receives and displays responses from websites that contain the requested information relating to the query.

When the IBSP website computer program is installed on each website, all websites will respond to search requests from the IBSP client software, thereby conducting simultaneously searches on virtually every website computer on the World Wide Web. Any such IBSP search examines the information on every website as it exists at the moment of the search. Thus, all information is current. The system accounts for not only the existing information on websites, but also accounts for the fact that certain websites have become active or inactive. In the case of inactive websites, information is not returned. Conversely, the IBSP search process can instantaneously account for the activation of new websites because website information is transmitted to the IBSP server computer at website startup and this information can be acquired by clients on demand. Since each website performs a search of its own database in response to the client query, information that is returned to a client is both current and complete.

It is important to note that the website query categorization actions are not required in order to perform an IBSP search. Such categorization is used to minimize the bandwidth required to perform a search in that categorization maximizes the search efficiency. If website categorization is not utilized however, queries are transmitted to all websites instead of to an appropriate subset of websites that are most likely to have the desired information. As such, categorization reduces the query process and the burden on all of the individual websites of the World Wide Web as well as the transmission burden of sending the message to all websites simultaneously.

In the broadcast server embodiment of the present invention, the burden of the client transmitting queries to many websites is removed by transferring that responsibility to a broadcast server. In the IBSP broadcast server embodiment, four types of inter-networked computers are present: a client or end user computer, web site computers, the IBSP server computer, and broadcast server computers. Naturally there are many client, website, and potentially numerous broadcast server computers. Only one IBSP server computer is required again, although this is not meant as a limitation. Each of these computer types requires a different IBSP computer program. All IBSP programs interact with the other programs to achieve the desired search.

Website computers in the IBSP broadcast server process contain the same IBSP website computer program noted above. Thus, the website can create its own categorization, transmit its IP address and characterization to the IBSP server, receive and process client queries, in this case, via the broadcast server computer, and send information to the client computer.

The IBSP server computer contains the same IBSP server computer program first noted above. Thus, the same program actions are conducted such as, receiving and storing the IP address as well as the website categorization from all website computers, transmitting the data file containing the IP address and website categorization, in this case, to IBSP broadcast server computers upon request.

Client computers contain an IBSP client computer program which performs the following functions: the program accepts queries from the user of the client computer for searching on the World Wide Web, permits the user of the client computer to categorize each query with multi level categorization of information from the various websites, transmit the client IP address, the query, and the categorization information to a IBSP broadcast server, and receive and display responses from websites that contain requested information.

The IBSP broadcast server computer contains an IBSP broadcast server computer program which performs the following functions: it acquires the data file containing the IP address and website categorization information of all website computers by making requests to the IBSP server computer upon software installation, periodically thereafter, and on demand. In addition, the broadcast server receives queries, categorization information, and the client's IP address from the clients, in order to execute the search desired by the clients. Finally, the broadcast server transmits each query and the requesting client's IP address to all websites that have the same multi level characterization as the query, or in the alternative, simply broadcast the search to all websites where categorization information is not available.

This broadcast server process embodiment of the present invention is more efficient since the bandwidth required to transmit the data file containing the IP address and the website categorization information of all website computers is reduced by simply transmitting that information to fewer broadcast server computers. Thus, the need to transmit such information to each potential client is eliminated. Further, the broadcast server process transfers the burden of transmitting queries to many websites from the client to the broadcast server. Thus, many clients are no longer broadcasting search requests, but a smaller subset of broadcast server computers are performing this task.

In some instances, client computers will be connected to the World Wide Web via a firewall computer. This is particularly the case in organizations where many computers are present but only one access to the Internet is permitted. Thus individual client computers may not have unique Internet IP addresses. In general, a unique IP address is necessary in order to transmit responses from a website directly to a particular client. However, in general, most individual clients within an organization have a unique address, at least within the organization. Thus by placing the broadcast server program on a firewall computer, thereby creating a firewall server and by directing website responses to client queries first to the firewall server, the firewall server will then forward any response to the correct client. In the IBSP firewall server process, four types of Internet work computers are present: client or end user computers, website computers, the IBSP server computer, and firewall server computers. Again, there are many client, website, and firewall server computers but there need only be one IBSP server computer, although this is not meant as a limitation.

Each computer type contains a different IBSP computer program and each program interacts with the other programs as described below.

Website computers of the IBSP firewall server process contain the same IBSP website computer program noted above. The functions of the website computer are again to permit categorization of the websites content, to transmit the unique IP address of the website and the categorization information to the IBSP server computer, receiving and processing client requests for information which, in this case, are forwarded by firewall computers and, if the requested information is present, sending that information back to the firewall server computer for forwarding to the client.

The IBSP server computer in the firewall server process also contains the same IBSP server computer program first noted above. The IBSP server computer in the firewall server process receives and stores in a data file the IP address and the website categorization from all website computers. Further, the IBSP server transmits the data file containing the IP address and website categorization information of all website computers to the firewall server computers upon request.

Client computers contain an IBSP client computer program similar to that described above. The IBSP client computer program and the firewall server process accepts queries from the user of he client computer, permits the user of the client computer to categorize each query within a multi level categorization scheme, transmits the client IP address, the query, and the categorization information, in this case, to a firewall server, and receives and displays website responses transmitted from websites and which are forwarded by the firewall server computer.

The firewall server computer contains an IBSP firewall server computer program which performs the following functions: it acquires the data file that contains the IP address and website categorization information of all website computers by requesting such information from the IBSP server computer. This request occurs at software installation and periodically thereafter. The firewall server computer also receives the client's IP address, queries and categorization information from a client computer. The firewall server computer also forwards each client query and client IP address to all websites that have the same level categorization as noted by the client. In the even that the client does not possess such categorization information, the firewall server computer submits the query to all websites. The firewall server computer also receives responses to a client query and the requesting client IP address from website computers and forwards those website responses to the client within the organization.

Thus the firewall server process permits clients, who do not possess unique IP address, to perform an IBSP Internet wide search.

In each of the alternative embodiments noted above, the same general function is performed, that is a simultaneous search of all websites on the World Wide Web. The system and method of the present invention will be more fully understood by a review of the detailed description of the invention that follows.

BRIEF DESCRIPTION OF THE FIGURES

FIG. 2 illustrates the architecture and communications flow of the IBSP broadcast server process.

FIG. 3 illustrates the architecture and communications flow of the IBSP firewall server process.

DETAILED DESCRIPTION OF THE INVENTION

Figure 1:
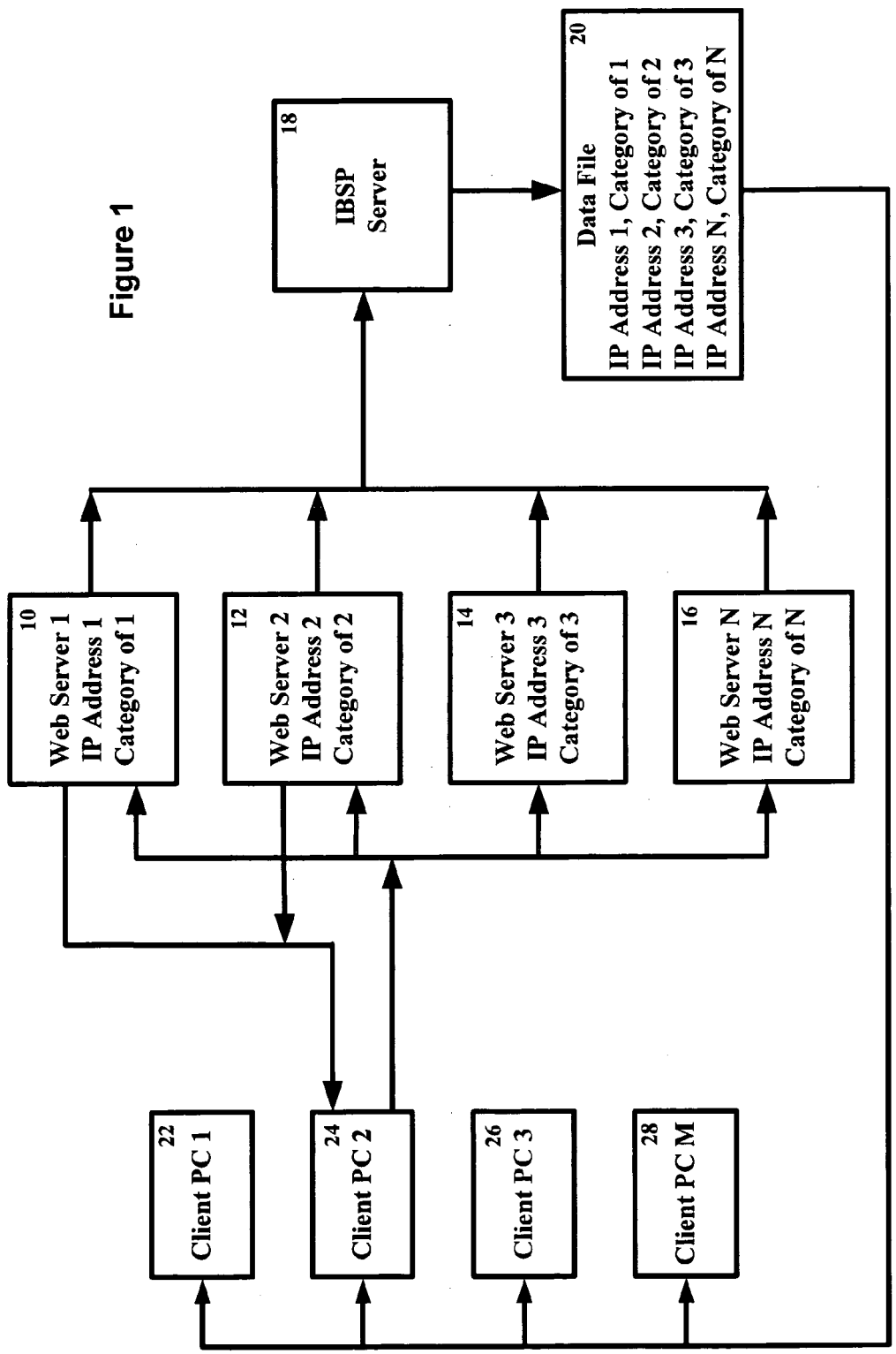
FIG. 1 illustrates the architecture and communications flow of the IBSP direct broadcast process.

As noted above, the present invention is a system and method for searching instantaneously for information on the World Wide Web. Using the architecture as noted below, a client can simultaneously search every website on the World Wide Web, hereby allowing for complete research to be accomplished. Referring to FIG. 1, the architecture and communications flow of the IBSP direct broadcast process is illustrated. Websites 10, 12, 14, and 16 all comprise servers of the type known in the art for managing websites. IBSP software on the websites categorize the information that is stored on the website and transmits their individual IP addresses and categorization information to the IBSP server 18. This results in a data file 20 on the IBSP server 18 which comprises the IP address and category information for the various websites 10, 12, 14, and 16. It should be noted that, while four websites are shown, this is not meant as a limitation. It is intended that eventually all websites will have the IBSP software resonant on the website, therefore thousands of websites would be represented. Similarly, the IBSP server 18 is a conventional type server using Windows NT or the like, and having storage for storage of the data file 20. The IP addresses and category information in the data file 20 are made available to clients 22, 24, 26, and 28 each of which clients have IBSP client software on them. Queries are categorized by the client and sent with the client IP address to websites with the same categorization as the query. If the category information is not available, the query and client IP address are simply broadcast to all the web servers 10, 12, 14, and 16. When a web server receives such a request, its searches itself and determines if any information responsive to the search request is available. In this illustration, web server 10 and 12 have information that is responsive to a search query posed by client 24. In that instance, information is returned to the client.

Referring to FIG. 2, the IBSP broadcast server process architecture and communications flow is illustrated. Again, servers 10, 12, 14, and 16 each contain IBSP website software which categorizes the information on each website and transmits it along with the individual website IP addresses to the IBSP server 18. From this information the IBSP server 18 creates a data file 20 which comprises the individual IP addresses and categorization information for the websites 10, 12, 14 and 16.

IP address and categorization information in data file 20 is transmitted in this case to IBSP broadcast server 30 where that information is stored. Clients 22, 24, 26, and 28 can create queries to go over the World Wide Web. These queries are categorized and, in this instance, proceed with the client IP address to the IBSP broadcast server 30. IBSP broadcast server 30 uses any query category information available to transmit the query and Client IP address to websites with the same categorization or if no category information is available transmits the request to all websites on the World Wide Web 10, 12, 14, and 16. In the event that any particular website has information responsive to the query, such information is reported back to the client that has made the query. In this illustration, website 10 and 12 each have information that is responsive to the query. That information is returned to client 24, which is the client that created the query first sent to the IBSP broadcast server 30.

Referring to FIG. 3, the architecture and communications flow of the firewall server process is illustrated. Once again, software that is resident on individual website computers 10, 12, 14, and 16 categorize the information in the website and transmit that along with individual IP addresses to IBSP server 18. IBSP server 18 creates the data file comprising the IP address and category information of the websites 10, 12, 14, and 16. That IP address and category information is provided, in this case, to an IBSP firewall server 32. Firewall server 32 receives queries and client IP addresses from clients 22, 24, 26, and 28 along with any category information. IBSP firewall server 32 then provides that categorized query, the client IP address, the and firewall server IP address to websites with the same categorization or if no category information is available transmits the request to all websites on the World Wide Web 10, 12, 14, and 16.

Any websites that have information that is responsive to the queries provide that information and the requesting client IP address back to the IBSP firewall server 32. In this instance, web server 10, and 12 have information responsive to the query from the client. The IBSP firewall server 32 then transmits that information to the appropriate client 24 that posed the initial query.

Note that, during all Internet Protocol communication, the computer initiating a transmission always transmits its own IP address, along with any other information, to the computer receiving the transmission. Additionally note that computers with information other than web sites can utilize and participate in the Internet Broadcast Search Paradigm (IBSP). Any computer with any information available to other computers can utilize the IBSP. These computers can reside either on an internal Intranet, a private Internet, or the global Internet.

Using the system of the present invention, any IBSP broadcast search instantaneously accounts for any changes in information at any website. Further, an IBSP search instantaneously accounts for any activation or deactivation of websites on the World Wide Web, returning information only from those web sites that are still active. Using the system and method if the present invention, all websites are searched simultaneously and, as the number of websites increase, the searching increases along with the increase in the number of websites. Furthermore, the search occurs in the minimum theoretical time.

Additional embodiments within the scope of the invention are also possible. Less efficient hybrid processes exist that performs the same overall function as the Internet Broadcast Search Paradigm (IBSP). A first hybrid process is a combination of the direct broadcast process and the broadcast server process. This direct broadcast/broadcast server hybrid process is the same as the broadcast server process except that the data file with IP address and site category information is transmitted from the IBSP server to all the client computers instead of to the IBSP broadcast server. The client then transmits the IP addresses of sites that will be queried along with its own IP address and the query to the IBSP broadcast server.

A second hybrid process is a combination of the direct broadcast process and the firewall server process. This direct broadcast/firewall server hybrid process is the same as the firewall server process except that the data file with IP address and site category information is transmitted from the IBSP server through the firewall server to all the client computers instead of only to the IBSP firewall server. The client then transmits the IP addresses of sites that will be queried along with its own IP address and the query to the IBSP firewall server.

A system and method for an Internet Broadcast Search Paradigm has now been illustrated. It will be appreciated by those skilled in the art that other embodiments of the present invention are possible without departing from the scope of the invention as disclosed.

What is claimed is:

1. A method of instantaneously searching a network of interconnected computers and servers comprising:
   a plurality of information servers connected to a network and categorizing information general content stored on themselves;
   collecting and storing the categorization and network addresses of the information servers on at least one IBSP server;

transmitting the categorization and network addresses of the plurality of information servers from an IBSP server to broadcast server nodes over the network;

accepting a query on a user node connected to the network;

transmitting the query from the user node directly to a broadcast server over the network;

the broadcast server receiving and transmitting the user node query to the plurality of information servers;

the information servers instantaneously searching themselves for specific content responsive to the user node query; and each of the plurality of information servers transmitting a response to the user node query to the user node when responsive content is found.

2. The method of instantaneously searching a network of interconnected computers and servers of claim 1 further comprising:

the user node categorizing each user node query prior to transmitting the user node query; and the broadcast server transmitting the user node query to a plurality of information servers that have appropriate categorization.

3. The method of instantaneously searching a network of interconnected computers and servers of claim 1, wherein the categorization and network addresses comprise information selected from the group consisting of website language, general contents, domain name, and IP address.

4. The method of instantaneously searching a network of interconnected computers and servers of claim 1, further comprising connecting the user node to the network via a firewall.

5. A system for instantaneously searching a network of interconnected computers and servers comprising:

a plurality of information servers connected over a network, each comprising instructions for categorizing general content resident on the information servers to form a categorization and for transmitting their network address and categorization to an IBSP server;

the IBSP server connected to the network and comprising instructions for receiving the network addresses and categorization from the information servers and for transmitting same to a plurality of user nodes connected to the IBSP server over the network;

the plurality of user nodes each comprising instructions for receiving the network addresses and categorization of the information servers from the IBSP server and for accepting and categorizing user queries;

the plurality of user nodes further comprising instructions for transmitting the user nodes' network address and the categorized queries to the plurality of information servers with the same categorization as the query; and the information servers further comprising instructions for instantaneously searching themselves for specific content responsive to the categorized queries from the user nodes and returning a response to the categorized queries to the user nodes transmitting the categorized queries when content responsive to the categorized queries is found.

6. A system for instantaneously searching a network of interconnected computers and servers comprising:

a plurality of information servers connected over a network, each comprising instructions for categorizing general content resident on the information servers to form a categorization and for transmitting their network address and categorization to an IBSP server;

the IBSP server connected to the network and comprising instructions for receiving the network addresses and categorization from the information servers and for transmitting same to a plurality of broadcast server nodes;

a plurality of user nodes each comprising instructions for accepting and categorizing user queries;

the plurality of user nodes further comprising instructions for transmitting the user node's network address and the categorized queries to a broadcast server over the network;

a plurality of broadcast servers each comprising instructions for receiving the network addresses and the categorization of the information servers from the IBSP server;

the broadcast server further comprising instructions for receiving the user nodes' network addresses and the categorized queries from the plurality of user nodes and for transmitting same to the plurality of information servers; and the information servers further comprising instructions for instantaneously searching themselves for specific content responsive to the categorized queries from the user nodes and returning a response to the categorized queries to the user nodes transmitting the categorized queries when content responsive to the categorized queries is found.

7. A system for instantaneously searching a network of interconnected computers and servers comprising:

a plurality of information servers connected over a network, each comprising instructions for categorizing general content resident on the information servers to form a categorization and for transmitting their network address and categorization to an IBSP server;

the IBSP server, connected to the network, comprising instructions for receiving the network addresses and categorization from the information servers and for transmitting same to a plurality of firewall server nodes;

a plurality of user nodes comprising instructions for accepting and categorizing user queries;

the plurality of user nodes further comprising instructions for transmitting the user node's network address and the categorized queries to a firewall server over the network;

a plurality of firewall servers each comprising instructions for receiving the network addresses and the categorization of the information servers from the IBSP server;

the firewall servers further comprising instructions for receiving the user node's network addresses and categorized the queries from a plurality of user nodes;

the firewall servers further comprising instructions for transmitting the firewall node's network address, the user node addresses, and the categorized queries to the plurality of information servers; and the information servers further comprising instructions for searching themselves for specific content responsive to the categorized queries from the user nodes and returning a response to the categorized queries to the firewall server for forwarding to the user nodes transmitting the categorized queries when content responsive to the categorized queries is found.

8. A system for internet broadcast searching, comprising:

a network that provides internet protocol (IP) communication;

a plurality of client computers connected to said network;

a plurality of website computers connected to said network;

at least one internet broadcast search paradigm (IBSP) server connected to said network; and at least one broadcast server connected to said network;

wherein said plurality of client computers include client software instructions to accept and categorize a search query from a user, to transmit said search query, a search query category and client computer IP address directly to said at least one broadcast server, and to receive search query results directly from responding website computers comprised of an IP address of the responding website computer and information responsive to said query from said responding website computer;

wherein said plurality of website computers include website software instructions to periodically perform categorization of said website's general content, to periodically send their IP address and categorization to said at least one IBSP server, to search said website's content as it currently exists when a search query is received, and to respond directly to a search query by sending said website's IP address and a response to said search query directly to the client computer IP address;

wherein said at least one IBSP server includes software instructions to periodically receive IP address and a categorization from said plurality of website computers, to periodically create a data file of IP address and categorization for all of said plurality of website computers, and to periodically transmit said data file to each of said at least one broadcast server; and wherein said at least one broadcast server includes software instructions to receive a data file from said at least one IBSP server, to receive search queries with associated search query categories and client computer IP addresses directly from said plurality of client computers, to match said search query categories with website categorization in said data file, and to transmit search queries and associated client IP addresses directly to IP addresses of any website computers that have a categorization matching the search query categories.

9. The system as in one of claims 5–8, wherein said network is selected from the group consisting of an intranet, an internet, the Internet, and combinations thereof.

10. The system as in one of claims 5–8, wherein said IP address is selected from the group consisting of a numerical IP address, a fully qualified domain name, and both a numerical IP address and a fully qualified domain name.

11. The system as in one of claims 5–8, wherein said at least one IBSP server is selected from the group consisting of a single IBSP server and a plurality of load-balancing IBSP servers.

12. The system as in one of claims 5–8, wherein said at least one broadcast server comprises a plurality of broadcast servers.

13. A method for internet broadcast searching, comprising:

providing client software to a plurality of client computers connected to a network that provides internet protocol (IP) communication so as to allow said client computers to accept and categorize a search query from a user, to transmit said search query, a search query category and client computer IP address directly to at least one broadcast server, and to receive search query results directly from responding website computers comprised of an IP address of the responding website computer and information responsive to said query from said responding website computer;

providing website software to a plurality of said website computers connected to said network so as to allow said website computers to periodically perform categorization of said website's general content, to periodically send their IP address and categorization to at least one IBSP server, to search said website's content as it currently exists when a search query is received, and to respond directly to a search query by sending said website's IP address and a response to said search query directly to the client computer IP address;

providing IBSP software to said at least one IBSP server so as to allow said at least one IBSP server to periodically receive an IP address and a categorization from said plurality of website computers, to periodically create a data file of IP address and categorization for all of said plurality of website computers, and to periodically transmit said data file to each of said at least one broadcast server; and providing broadcast server software to at least one broadcast server so as to allow said at least one broadcast server to receive a data file from said at least one IBSP server, to receive search queries with associated search query categories and client computer IP addresses directly from said plurality of client computers, to match said search query categories with website categorization in said data file, and to transmit search queries and associated client IP addresses directly to IP addresses of any website computers that have categorization matching the search query categories.

14. The method of claim 13, further comprising selecting said network from the group consisting of an intranet, an internet, the Internet, and combinations thereof.

15. The method of claim 13, further comprising selecting said IP address from the group consisting of a numerical IP address, a fully qualified domain name, and both a numerical IP address and a fully qualified domain name.

16. The method of claim 13, further comprising selecting said at least one IBSP server from the group consisting of a single IBSP server and a plurality of load-balancing IBSP servers.

17. The method of claim 13, wherein said at least one broadcast server comprises a plurality of broadcast servers.

* * * * *